July 15, 1969   J. H. EAGLE ET AL   3,455,218
LEVEL SENSING AUTOMATIC EXPOSURE CONTROL FOR DAYLIGHT AND FLASH
Filed Oct. 28, 1965   4 Sheets-Sheet 1

JOHN H. EAGLE
DONALD M. HARVEY
ROBERT W. SEEBECH
INVENTORS

BY R. Frank Smith
   Ronald S. Kareken

ATTORNEYS

July 15, 1969   J. H. EAGLE ETAL   3,455,218
LEVEL SENSING AUTOMATIC EXPOSURE CONTROL FOR DAYLIGHT AND FLASH
Filed Oct. 28, 1965   4 Sheets-Sheet 2

JOHN H. EAGLE
DONALD M. HARVEY
ROBERT W. SEEBECH
INVENTORS

BY

ATTORNEYS

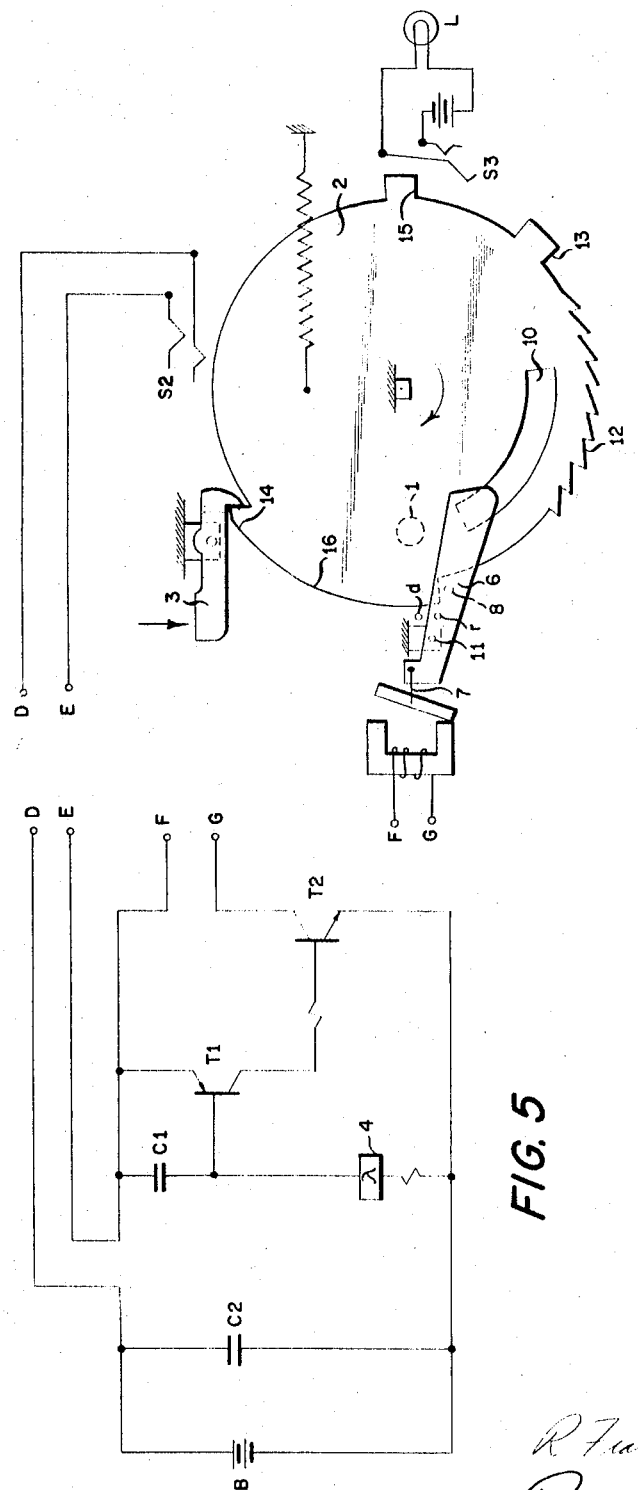

July 15, 1969        J. H. EAGLE ETAL        3,455,218
LEVEL SENSING AUTOMATIC EXPOSURE CONTROL FOR DAYLIGHT AND FLASH
Filed Oct. 28, 1965                           4 Sheets-Sheet 4
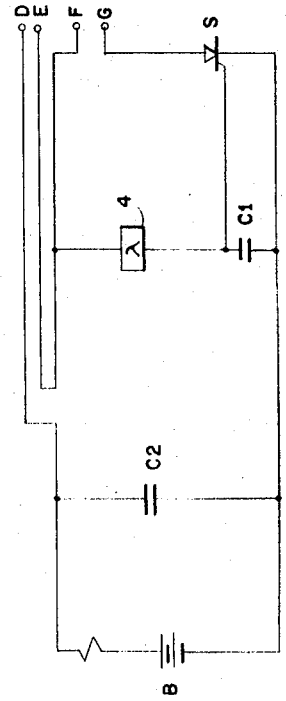
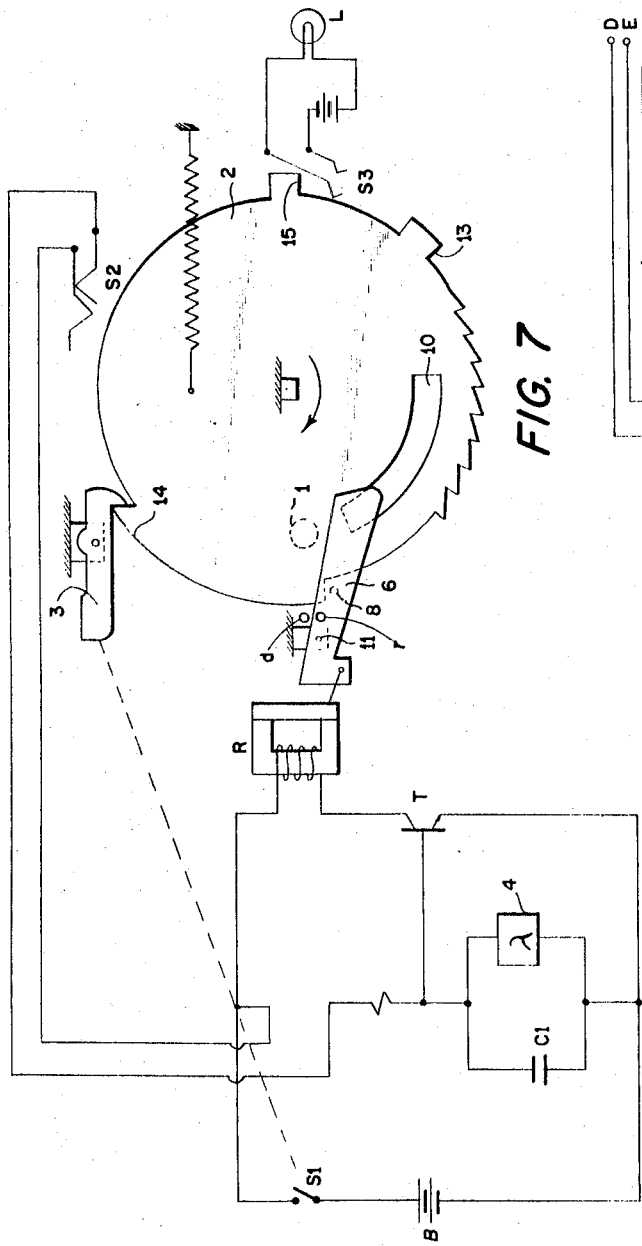
JOHN H. EAGLE
DONALD M. HARVEY
ROBERT W. SEEBECH
INVENTORS
BY *R. Frank Smith*
   *Ronald S. Kauler*
                ATTORNEYS United States Patent Office 3,455,218
Patented July 15, 1969

3,455,218
LEVEL SENSING AUTOMATIC EXPOSURE CONTROL FOR DAYLIGHT AND FLASH
John H. Eagle, Donald M. Harvey, and Robert W. Seebech, Rochester, N.Y., assignors to Eastman Kodak Company, Rochester, N.Y., a corporation of New Jersey
Filed Oct. 28, 1965, Ser. No. 505,513
Int. Cl. G01j 1/44; G03b 9/62
U.S. Cl. 95—10                              13 Claims

ABSTRACT OF THE DISCLOSURE

An automatic exposure control system for cameras with flash or daylight operation, having a first shutter movable to open the exposure aperture and a trigger circuit responsive to an increasing signal from a timing circuit to actuate a second shutter to close off the exposure aperture when the signal reaches a predtermined level. The second shutter includes structure to stop further movement of the first shutter when actuated.

---

This invention relates generally to photographic apparatus and more particularly to an exposure control device for photographic cameras.

Various devices have been employed in photographic cameras for automatically controlling exposure time in response to scene light. Some devices utilize bridge circuit arrangements having arms resistively responsive to light intensity. An opaque vane substitutes as the indicator of a galvanometer responsive to conditions of unbalance in the bridge circuit. The degree of unbalance necessary to deflect the vane into position to shut off light through the camera's objective lens is usually variable by adjustment of the resistance in one of the ratio arms of the bridge.

Other devices include time control circuitry responsive to light intensity for controlling travel time of a spring loaded shutter. Integration exposure meters are commonly used and operate on the principle of the charging or discharging of a capacitor in accordance with a time constant determined by light intensity. A prescribed level of charge causes the triggering of a device which closes the shutter.

The mechanical apparatus asssociated with most of the known devices is subject to delay action time and is intricate in design. Moreover, most of the exposure time circuits require highly intricate photoelectric control and are suitable only for limited purposes.

This invention contemplates an integration exposure meter technique employed in conjunction with a dual shutter arrangement. A spring loaded first shutter is released to expose a photographic film to scene light through a camera object lens and to energize a timiing circuit. A constantly increasing signal is applied from the timing circuit to a trigger circuit at a rate of increase determined by the intensity of scene light as observed by a photo-sensitive element. When the signal reaches a predetermined voltage level, the trigger circuit fires to actuate a second shutter which closes off the photographic film from light and stops the first shutter in its travel. The second shutter is very close to the object lens before actuation and rapidly moves to its blocking position. Sensitivity of the system may be varied by adding or removing resistance from the timing circuit to vary the time constant of the increasing signal.

An object of this invention is to provide a device for automatically controlling the film exposure time of a photographic camera.

Another object of this invention is to provide for a photographic camera an exposure control device which automatically closes the camera exposure aperture at a time determined by the intensity of scene light.

A further object of this invention is to provide for a photographic camera an automatic exposure control device responsive to scene light from daylight or flash to rapidly close the camera exposure aperture after an exposure time determined by the intensity of scene light and the speed or sensitivity of the photographic film.

Other objects and advantages will become apparent in the following description with reference to the appended drawings of which:

FIG. 3 is a view of a portion of another embodiment of the invention,

FIG. 5 is an alternative diagram of an electrical circuit for the embodiment of FIG. 3, FIG. 6 is another alternative diagram of an electrical circuit for the embodiment of FIG. 3, and FIG. 7 is another embodiment of the invention.

The invention as depicted in FIGS. 1–7 comprises two basic portions: a shutter mechanism and an associated exposure control circuit. The basic principles of operation will be described in detail with regard to FIGS. 1 and 2 and will be referred to in the later description of the various other embodiments.

According to the invention, the operation of the camera shutter, which directly determines the exposure time of each photograph, should be largely determined by the intensity of scene illumination and the photographic speed of the film. It is desirable to adjust the exposure time to obtain optimum performance from the film and camera. This invention automatically achieves this goal by the use of a two shutter mechanism as heretofore described. For the purpose of discussion, it will be assumed that the first shutter, which initially uncovers the camera object lens, is a fixed speed shutter. It will also be assumed that if the second shutter were not actuated to close off the film from scene light, the film would be overexposed. In other words, the speed of the first shutter will be slower than that required by the film speed and light intensity for both daylight and flash operation. Such assumptions are helpful for purposes of discussion and are practical under normal picture-taking conditions. Of course, it is to be understood that the speed of the first shutter could be varied if desired. Such speed variation might be advisable, for example, when taking prolonged non-flash exposures under near-darkness conditions.

Figure 1:
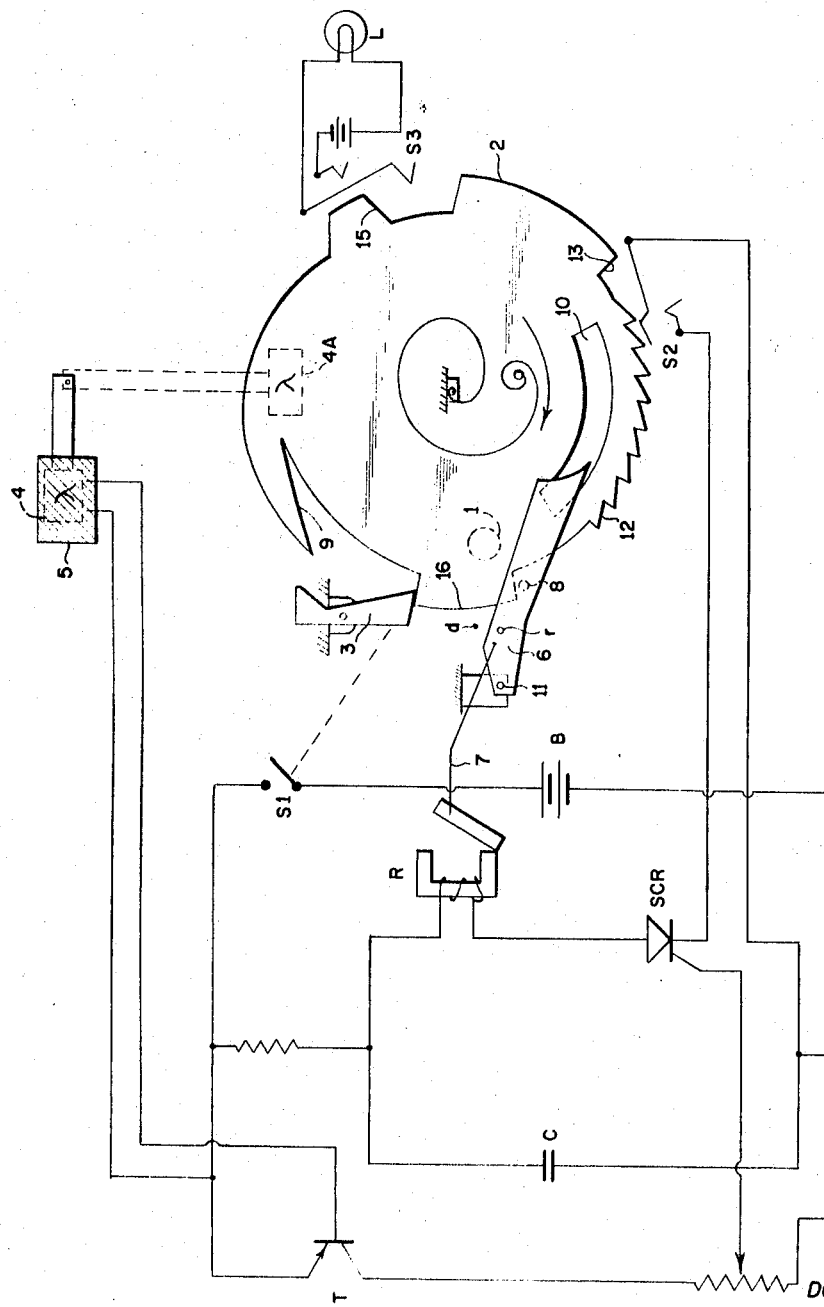
FIG. 1 is a view of a preferred embodiment of the invention.

FIG. 1 shows the first shutter as comprising a shutter disk of circular configuration rotatably supported at its center. Shutter disk 2 is spring biased in the clockwise direction and is held in the cocked position shown by an accessible shutter release 3. Shutter disk 2 may be of any suitable opaque material and initially serves as a blind to close off light from the film through camera object lens or exposure aperture. Opening or shutter aperture 10 is provided to uncover the lens 1 to expose the film to scene light and is located in a circular arc about the axis of rotation of shutter disk 2.

The second or fast release shutter blade 6 is pivotally supported at pivot pin 11 and is actuated through a diagrammatically illustrated link 7 by the energization of relay R. Pin 8 on shutter blade 6 is adapted to engage with ratchet teeth 12 of shutter 2 to stop clockwise motion of shutter 2 upon actuation of fast release shutter blade 6. Switch S3 is adapted to be closed by projection or cam 15 for energization of the flash circuit in a timed relation suitably determined by the light output characteristics of the flash lamp.

The circuitry to the left of the shutter mechanism represents an exposure or time control circuit for determining film exposure time by controlling the actuation of relay R and consequently controlling fast release shutter blade 6 through link 7. The time control circuit includes a trigger circuit to which is provided a constantly increasing trigger control signal with respect to time. The trigger circuit is designed to fire at a predetermined voltage level of the control signal to initiate actuation of relay R. Therefore, the time required for the trigger circuit to fire is dependent upon the slope of the constantly increasing signal which, as described below, is proportional to the intensity of illumination of the scene.

Under daylight conditions, or for other conditions of constant illumination, it is desirable to simulate conditions of gradually increasing illumination to provide a signal of sufficient slope for proper light integration. Referring to FIG. 1, a photosensitive element 4, such as a silicon light sensing cell, is shown to be selectively movable to two positions represented as 4 and 4A. For daylight or other constant scene light photography, the light sensitive cell is placed in the position shown as 4A and is initially closed off from scene light by means of shutter 2. As shutter 2 is released and begins its clockwise rotation, cell 4A is gradually unmasked through the wedge shaped opening defined by projection 9. Thus, the cell 4A provides, under conditions of constant illumination, a constantly varying resistance to the exposure control circuit.

The operational sequence of the device under daylight conditions begins with the tripping of shutter release 3, allowing shutter 2 to rotate. Shutter release 3, when tripped, also closes power switch S1 to electrically place power source B into the exposure control circuit. Capacitor C then begins to charge. As exposure aperture 1 is uncovered by opening or aperture 10 of shutter 2, switches S2 and S3 are closed by contact with projections 13 and 15 respectively, the closing of switch S2 thereby activating the trigger circuit represented by silicon controlled rectifier SCR and potentiometer P. A flash bulb L would not, of course, be used for daylight photography. As the exposure aperture 1 is uncovered, light sensitive cell 4A gradually begins to become unmasked. As cell 4A is uncovered and exposed to scene illumination, its resistance decreases to provide a rising base to emitter voltage in transistor T. As transistor T becomes increasingly conductive, the voltage level across potentiometer P increases, thereby increasing the gate voltage of the SCR. Thus, transistor T, potentiometer P and cell 4A serve as a transistor amplifier having a constantly varying output signal of slope dependent upon the intensity of illumination of the scene light. The circuit therefore serves as a light integrating circuit for conditions of constant illumination.

The sensitivity of the system may be adjusted by means of potentiometer P in accordance with film speed or other considerations. Potentiometer P regulates the lapse of time before the SCR fires. When the gate voltage of the SCR reaches a level sufficient to cause it to fire, capacitor C is discharged through the coil of relay R, causing relay R to actuate. Actuation of relay R causes link 7 to pivot fast closing shutter blade 6 in a counter-clock-wise direction to cover exposure aperture 1, which is still within opening 10, and move pin 8 into the path of movement of shutter 2. A fixed spring-loaded detent $d$ engages a recess $r$ in shutter blade 6 to hold shutter blade 6 in its aperture covering position and to stop rotation of shutter 2 by engagement to pin 8 with one of the teeth 12.

Figure 2:
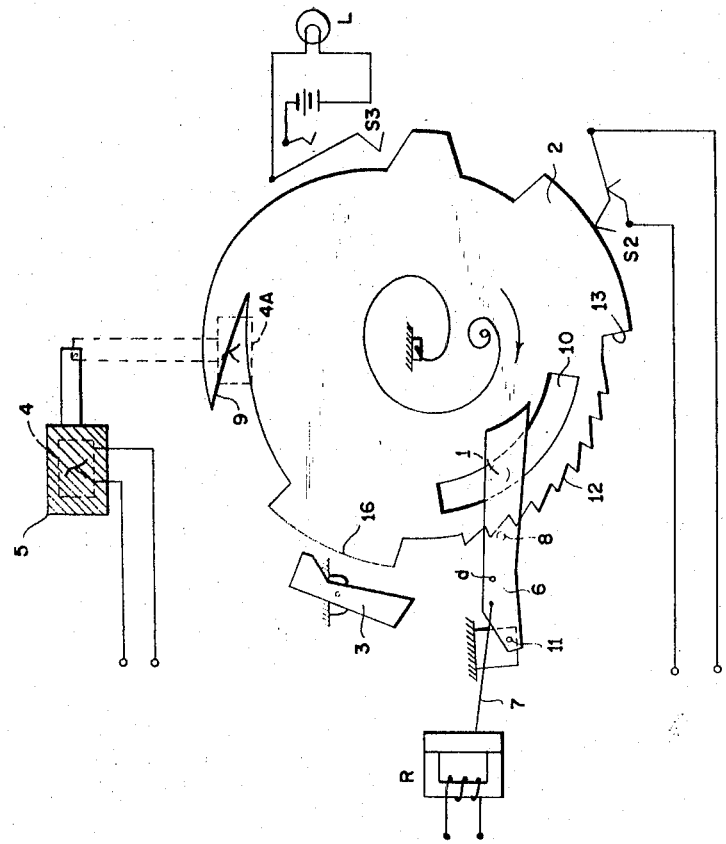
FIG. 2 is a view of a portion of the embodiment of FIG. 1.

FIG. 2 shows the position of shutter 6 after actuation of relay R. Light sensitive cell 4A remains only partially uncovered because it is so positioned with respect to projection 9 as to be fully uncovered only as the trailing edge of opening 10 closes exposure aperture 1. The shutter mechanisms remain in the condition shown in FIG. 2 until shutter 2 is re-cocked by counterclockwise rotation using a suitable mechanism, not shown. During recocking, ratchet teeth 12 permit rotation without disengaging the shutter blade 6 from its detent $d$. Shutter 6 therefore remains in its position in front of exposure aperture 1 until 1 is covered by shutter 2 and pin 8 is contacted by projection 16 on shutter 2 to move the blade 6 from engagement with detent $d$. Shutter 6 then returns to its initial position as shown in FIG. 1 under the action of a light return spring (not shown).

For flash operation, the light sensitive cell is removed from behind the shutter 2 to the position shown as 4 in FIG. 1. The cell 4 is exposed to the scene to be photographed before release of shutter 2 and may be shielded by a filter 5 chosen to match the sensitivity of the exposure control circuit to the flash and film specifications, or to the camera-to-subject distance. After release of shutter 2, flash bulb L is ignited through the closing of switch S3 by projection 15 as the exposure aperture 1 is opened. The cell 4 is then immediately responsive to the increasing light from flash bulb L, and when the amplified signal from cell 4 reaches a predetermined voltage level the SCR fires, discharging capacitor C to energize relay R. The sequence of operation is otherwise the same as with daylight operation.

If in either the flash or daylight situation the illumination fails to be sufficient to cause the SCR to fire before the trailing edge of opening 10 covers lens 1, shutter 6 will be swung upward to cover the exposure aperture as projection 13 makes contact with pin 8.

Figure 4:
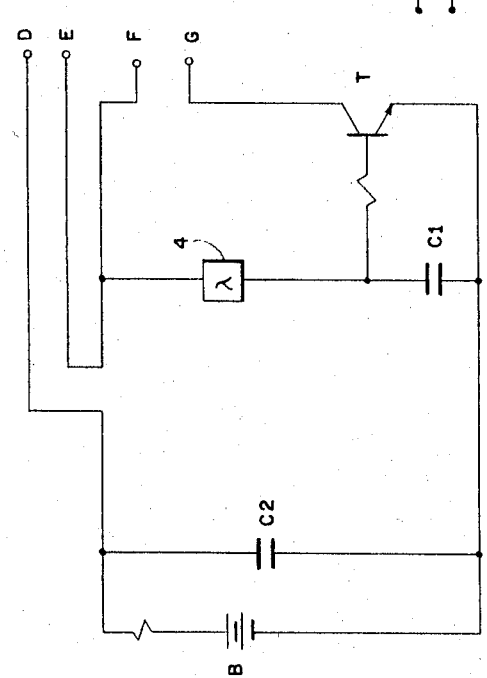
FIG. 4 is a diagram of an electrical control circuit for the embodiment shown in FIG. 3.

FIG. 3 shows the shutter mechanism with which the exposure control circuits of FIGS. 4, 5 and 6 are associated. The shutter mechanism of FIG. 3 follows the same basic sequence of operation as does that of FIG. 1. The time-light integration, however, is performed by the charging or discharging of a capacitor in the exposure control circuitry; therefore, the wedge unmasking technique for daylight photography employed in FIG. 1 by means of projection 9 is not present in the embodiments of FIGS. 3–6.

Upon release of the shutter release switch 3 of FIG. 3, shutter 2 begins its clockwise rotation. Switches S2 and S3 are closed as the lens 1 is uncovered. The relationship between shutters 2 and 6 is the same as that of FIG. 1; therefore, the following description will be given with regard to the circuit diagrams of FIGS. 4–6 respectively, bearing in mind that the shutter mechanism and respective circuit diagrams are electrically connected at points D, E, F and G. It is to be understood that filter means, shown as 5 in FIGS. 1 and 2, may be employed for use in flash photography.

In FIG. 4, capacitor C2 may be already charged to the voltage of battery B before shutter 2 is released by the depression of shutter release 3 or may be electrically inserted across battery B by means of a normally open switch which is closed by the depression of shutter release 3. After release of shutter 2, switches S2 and S3 are closed as exposure aperture 1 is exposed to the scene through opening 10. The closing of switch S2, across terminals D and E, places the time control circuitry across the source of potential B. Transistor T is initially in the "OFF" or non-conducting state. Light sensitive cell 4 is exposed to scene light, and capacitor C1, therefore, charges at a rate dependent upon the intensity of light falling on cell 4, the light intensity affecting the resistance of the cell 4. Thus, if the scene is very bright, the resistance of cell 4 will be less than with a less bright scene, and the time constant of the charging circuit of cell 4 and C1 will be less, thereby causing capacitor C1 to charge at a faster rate. It is to be understood that the resistance of cell 4 should be sufficiently large and the relative sizes of capacitors C1 and C2 should be such as to prevent capacitor C2 from discharging significantly before capacitor C1 is charged, in the case where capacitor C2 is already charged before release of shutter 2. Where capacitor C2 is inserted into the circuit upon depression of shutter release 3, the resistance of cell 4 must again be sufficiently large to allow capacitor C2 to charge much faster than capacitor C1.

Cell 4 and capacitor C1 act in combination as a light integrating circuit for the exposure control systems. When the charge on capacitor C1 lifts the base of transistor T to a sufficiently high value, transistor T turns "ON" and conducts. Capacitor C2 therefore discharges through T, causing energization of relay R and thereby actuating fast closing shutter 6.

Sensitivity of the system shown in FIGS. 3 and 4 may be varied by means of a resistance placed electrically in series with cell 4 and capacitor C1 or by means of a neutral density filter placed in front of cell 4. Re-cocking of shutter 2 is accomplished in the same manner as that disclosed with regard to FIG. 1 and 2.

In FIG. 5, capacitor C1 begins to charge upon the closure of switch S2 as in FIG. 4. The rate of charge of C1 depends upon the intensity of illumination falling on light sensitive cell 4. Transistor T1 requires a negative bias on its base for conduction, so as C1 charges, the base of T1 is initially positive but swings negative. T1 turns "ON" or conducts when the voltage level at its base is sufficiently negative. Conduction of transistor T1 raises the base voltage of transistor T2 sufficiently to cause T2 to conduct, thereby discharging capacitor C2 through T2 to energize relay R. Sensitivity may be controlled as with the other embodiments by means of filters or resistance added into the time constant circuit C1 and cell 4. Thus, FIG. 5 represents a cascaded light integration arrangement similar in operation to the device of FIG. 4.

FIG. 6 is basically the same circuit arrangement as that of FIG. 4 with the exception that transistor T of FIG. 4 has been replaced by a silicon controlled rectifier S. As the voltage level on capacitor C1 rises during charge, the gate voltage of the S rises accordingly. The S fires, and capacitor C2 discharges, causing actuation of relay R.

FIG. 7 shows an arrangement whereby the release of relay R causes actuation of shutter 6. Upon depression of shutter release 3, normally open switch S1 is closed. Capacitor C1 charges, raising the base voltage of transistor T into the conduction range to cause actuation of relay R. FIG. 7 shows the position of shutter 6 before actuation of relay R. The relay contact arm has been forced to the closed position by the clockwise motion of shutter 6 from in back of lens 1 as shutter 2 is cocked. Energization of relay R, therefore, merely holds shutter 6 in position to prevent it from covering lens 1 before the proper exposure time has elapsed.

As lens 1 is uncovered, normally closed switch S2 is opened by projection 14, and switch S3 is closed by projection 15 to fire flash bulb L if flash is being used. Capacitor C1 discharges through the base circuit of transistor T and through the light sensitive cell 4. The rate of discharge is therefore dependent upon the effective impedance of the parallel combination of cell 4 and the base impedance of the transistor, the effective impedance varying with different light intensities. When the discharge of capacitor C1 causes the base voltage of the transistor to drop to a sufficiently low value, transistor T cuts off and relay R is de-energized. Shutter 6 swings upward, forcing pin 8 into teeth 12 and detent $d$ into recess $r$.

For re-cocking, shutter 2 is rotated counter-clockwise, and projection 14 forces shutter 6 downward by its contact with pin 8. Switch S1 opens as shutter release 3 returns to its restraining position, cutting off supply voltage B from the circuitry. As in the previous embodiments discussed, it is to be undersood that the sensitivity of the system may be varied by filters or by added resistance in the time constant circuit according to flash, film, or other specifications.

The opening or aperture 10 of the embodiments of FIGS. 1–7 could be shaped to extend the exposure range of the system. One possibility would be to taper opening 10 such that it is narrower than the width of the exposure aperture 1 at its leading edge and is at least as wide as the full width of the lens toward the trailing edge. Under brightly lit scene conditions, the increased depth of field inherent in such aperture controlled automatic exposure control systems would be preserved. Also, the delay action time inherent in all time controlled systems could be compensated for by reducing the effective aperture size during the early portion of the exposure. This delay time is particularly significant with the use of flash.

This invention has been described in detail with particular reference to preferred embodiments thereof, but it will be understood that variations and modifications may be effected within the scope and spirit of the invention as described hereinabove and as defined in the appended claims. For example, the wedge-shaped opening defined by projection 9 in FIG. 1 may be replaced by a variable density filter which will also effectively increase photocell illumination.

We claim:

1. In a photographic camera having an exposure aperture to expose a photosensitive surface to scene light, a device for automatically controlling exposure time, comprising in combination:

shutter means including first and second shutters, said first shutter comprising a substantially flat disk rotatably supported about an axis substantially perpendicular to the planar surface of said disk and biased toward one rotational direction, shutter release means normally retaining said first shutter from rotation in said one rotational direction, means defining an opening in said first shutter to uncover said exposure aperture upon release of said first shutter by said shutter release means, and said second shutter comprising a pivoted vane adjacent said first shutter normally uncovering said aperture and being actuatable to cover said aperture and terminate exposure following actuation of said first shutter; and time control means including a source of electrical potential, means influenced by said source of potential and responsive to scene light for providing an electrical signal increasing during the exposure with respect to time, the increase of said electrical signal benig dependent upon the intensity of the scene light, and trigger means responsive to said electrical signal at a predetermined signal level thereof to actuate said second shutter, thereby terminating exposure, said first shutter further comprising teeth means disposed about a portion of the periphery thereof and said second shutter including pin means attached to said second shutter and selectively engageable with said teeth means upon actuation of said second shutter to its aperture covering position, whereby said first shutter is prevented from further rotation as said second shutter is actuated.

2. In a photographic camera, a device according to claim 1 wherein said means providing an electrical signal comprises photosensitive means resistively responsive to scene illumination, and comprising on said disk unmasking means effective during exposure for increasing illumination of said photosensitive means with respect to time.

3. In a photographic camera, a device according to claim 1 wherein said means providing an electrical signal comprises photosensitive means resistively responsive to scene illumination.

4 In a photographic camera, a device according to claim 3 wherein said time control means further comprises first capacitor means charged by said source of potential upon actuation of said first shutter, and means operable upon exposure to electrically connect said trigger means to said source of potential, and wherein said means providing an electrical signal further comprises second capacitor means charged by said source of potential through said photosensitive means, and wherein said trigger means comprises transistor means having a base circuit electrically connected with said second capacitor, said transistor means being electrically conductive as the charge on said second capacitor reaches a predetermined voltage level, said first capacitor being connected to be discharged through said transistor means upon conduction thereof, and relay means electrically connected with said transistor means and energized by the discharge of said first capacitor, said relay means being coupled with said second shutter for actuation thereof upon energization of said relay means.

5. In a photographic camera having an exposure aperture to expose a photosensitive surface to scene light, a device for automatically controlling exposure time, comprising in combination: shutter means including first and second shutters, said first shutter normally covering said aperture and being actuable to uncover said aperture and initiate exposure and said second shutter normally uncovering said aperture and being actuable to cover said aperture and terminate exposure following actuation of said first shutter; and time control means including a source of electrical potential, means influenced by said source of potential and responsive to scene light for providing an electrical signal increasing during the exposure with respect to time, the increase of said electrical signal being dependent upon the intensity of the scene light, and trigger means responsive to said electrical signal at a predetermined signal level thereof to actuate said second shutter, thereby terminating exposure, said means providing an electrical signal comprising photosensitive means resistantly responsive to scene illumination, and said time control means further comprising means operable upon exposure to electrically connect said trigger means to said source of potential, and first capacitor means charged by said source of potential upon actuation of said first shutter, and wherein said means providing an electrical signal further comprises second capacitor means charged by said source of potential through said photosensitive means, and wherein said trigger means comprises first and second transistors in cascade relationship, said first transistor having its base electrically connected with said second capacitor and conductive as the charge on said second capacitor reaches a predetermined voltage level, said second transistor being electrically connected with said first transistor and conductive upon conduction of said first transistor, said first capacitor being connected to be discharged through said second transistor and adapted to be energized by the discharge of said first capacitor, said relay means being coupled within said second shutter for actuation thereof upon energization of said relay means.

6. In a photographic camera having an exposure aperture to expose a photosensitive surface to scene light, a device for automatically controlling exposure time, comprising in combination: shutter means including first and second shutters, said first shutter normally covering said aperture and being actuatable to uncover said aperture and initiate exposure and said second shutter normally uncovering said aperture and being actuatable to cover said aperture and terminate exposure following actuation of said first shutter; and time control means including a source of electrical potential, means influenced by said source of potential and responsive to scene light for providing an electrical signal increasing during the exposure with respect to time, the increase of said electrical signal being dependent upon the intensity of the scene light, and trigger means responsive to said electrical signal at a predetermined signal level thereof to actuate said second shutter, thereby terminating exposure, said means providing an electrical signal comprising photosensitive means resistantly responsive to scene illumination, and said time control means further comprising first capacitor means charged by said source of potential upon actuation of said first shutter and means operable upon exposure to electrically connect said trigger means to said source of potential, and wherein said means providing an electrical signal further comprises second capacitor means charged by said source of potential through said photosensitive means, and wherein said trigger means comprises a silicon controlled rectifier having a gating circuit electrically connected with said second capacitor and being adapted to fire and electrically conduct as the charge on said second capacitor reaches a predetermined voltage level, said first capacitor being connected to discharge through said silicon controlled rectifier and energized by the discharge of said first capacitor, said relay means being coupled with said second shutter for actuation thereof upon energization of said relay means.

7. In a photographic camera having an exposure aperture for exposing a photosensitive surface to scene illumination, a device for automatically controlling exposure time comprising in combination: shutter means including first and second shutters, said first shutter normally covering said aperture and being actuatable to commence exposure by uncovering said aperture, said second shutter being actuatable to cover said aperture and terminate exposure following actuation of said first shutter; and time control means including a source of electrical potential having photosensitive means resistively responsive to scene illumination and influenced by said source of potential for providing an electrical signal increasing with respect to time during said exposure, the rate of the increase of said electrical signal being dependent upon the intensity of illumination of said scene, said means providing an electrical signal further comprising a transistor amplfier having a base circuit and an output circuit for providing said electrical signal and said photosensitive means being electrically connected in said base circuit, means responsive to the actuation of said first shutter for unmasking an increasing area of said photosensitive means with respect to time during exposure, trigger means responsive to said electrical signal at a predetermined signal level thereof when influenced by said source of potential to actuate said second shutter to terminate exposure, said trigger means comprising a silicon controlled rectifier having a gating circuit electrically connected with said output circuit and adapted to fire at said predetermined signal level, relay means electrically connected with said silicon controlled rectifier and coupled with said second shutter for actuation of said second shutter upon energization of said relay means, means operable during exposure to electrically connect said trigger means to said source of potential, and capacitor means adapted to be charged by said source of potential and electrically connected with said trigger means to discharge upon firing of said silicon controlled rectifier to energize said relay means.

8. In a photographic camera having an exposure aperture for exposing a photosensitive surface to scene illumination, a device for automatically controlling exposure time comprising in combination: shutter means including first and second shutters, said first shutter normally covering said aperture and being actuatable to commence exposure by uncovering said aperture, said second shutter being actuatable to cover said aperture and terminate exposure following actuation of said first shutter; and time control means including a source of electrical potential having photosensitive means resistively responsive to scene illumination and influenced by said source of potential for providing an electrical signal increasing with respect to time during said exposure, the rate of the increase of said electrical signal being dependent upon the intensity of illumination of said scene, and means responsive to the actuation of said first shutter for unmasking an increasing area of said photosensitive means with respect to time during exposure, trigger means responsive to said electrical signal at a predetermined signal level thereof when influenced by said source of potential to actuate said second shutter to terminate exposure, said trigger means comprising a silicon controlled rectifier having a gating circuit, means applying said electrical signal to said gating circuit to fire said silicon controlled rectifier at said predetermined signal level, relay means electrically connected with said silicon controlled rectifier and coupled with said second shutter for actuation of said second shutter, and wherein said time control means further comprises capacitor means adapted to be charged by said source of potential and electrically connected with said trigger means to discharge upon firing of said silicon control rectifier to actuate said relay means, and switch means operable during exposure to electrically connect said trigger means with said source of potential.

9. In a photographic camera having an exposure aperture to expose a photosensitive surface to scene light, an automatic exposure control device comprising a first shutter movable upon actuation from a position normally closing the aperture to commence exposure by uncovering the aperture; a second shutter normally open and actuated after actuation of the first shutter to terminate exposure by covering the aperture, the second shutter including means for engaging the first shutter upon actuation of said second shutter to terminate exposure to prevent further movement of the first shutter as said second shutter is actuated; the first shutter including means which contact said engaging means to terminate exposure by actuating said second shutter after a predetermined maximum exposure time; and time control means including an electrical circuit having a light responsive element providing an electrical signal increasing during the exposure with respect to time and trigger means responsive to a predetermined increased signal level actuating the second shutter.

10. An automatic exposure control device according to claim 9 wherein the first shutter comprises a rotatable flat disk having a first opening which uncovers the exposure aperture when rotated and a second tapered opening which gradually unmasks the light responsive element during exposure.

11. In a photographic camera, a device according to claim 9 wherein said first shutter includes teeth means and said engageable means comprises a pin selectively engageable with the teeth means upon actuation of said second shutter.

12. In a photographic camera having an exposure aperture to expose a photosensitive surface to scene light, an automatic exposure control device selectively operable for flash or daylight operation comprising: a first shutter movable upon actuation from a first position normally closing the aperture to commence exposure by uncovering the aperture; a second shutter normally open and actuated after actuation of the first shutter to terminate exposure by covering the aperture; and time control means to actuate the second shutter, the time control means including an electrical circuit having a light responsive element providing an electrical signal increasing during the exposure with respect to time and trigger means responsive to a predetermined increased signal level actuating the second shutter, the light responsive element being movable between a flash operating position wherein said element is unmasked and is responsive to increasing illumination from a scene illuminated by a flash lamp and a daylight operating position wherein said element is initially masked and is gradually unmasked by the first shutter during exposure.

13. In a photographic camera having an exposure aperture to expose a photosensitive surface to scene light, an automatic exposure control device comprising a first shutter normally closing the aperture and actuated to commence exposure by uncovering the aperture; a second shutter normally open and actuated after actuation of the first shutter to terminate exposure by covering the aperture; and time control means to actuate the second shutter, the time control means including an electrical circuit having a light responsive element providing an electrical signal increasing during the exposure with respect to time, switch means to close the circuit, and trigger means responsive to a predetermined increased signal level actuating the second shutter, the first shutter comprising a movable member having projection means to close the switch means upon actuation of the first shutter.

References Cited

UNITED STATES PATENTS

| | | | |
|---|---|---|---|
| 3,000,281 | 9/1961 | Rentschler | 95—10 |
| 3,205,799 | 9/1965 | Burgarella et al. | 95—10 |
| 3,208,365 | 9/1965 | Cooper et al | 95—10 |
| 3,291,019 | 12/1966 | Eagle | 95—10 |
| 3,318,217 | 4/1967 | Ernisee | 95—11.5 |
| 3,349,678 | 10/1967 | Suzuki et al. | 95—10 |
| 3,205,802 | 9/1965 | Wareham | 95—11.5 |
| 3,363,967 | 1/1968 | Schmitt | 95—10 |
| 3,385,187 | 5/1968 | Bestenreiner | 95—10 |

NORTON ANSHER, Primary Examiner

J. F. PETERS, Jr., Assistant Examiner

U.S. Cl. X.R.

95—11.5, 53